US012289488B2

(12) United States Patent
Roberts

(10) Patent No.: US 12,289,488 B2
(45) Date of Patent: Apr. 29, 2025

(54) ONE BUTTON ON-DEMAND CLOSED CAPTIONING

(71) Applicant: DISH Network L.L.C., Englewood, CO (US)

(72) Inventor: William Roberts, Centennial, CO (US)

(73) Assignee: DISH NETWORK L.L.C., Englewood, CO (US)

(*) Notice: Subject to any disclaimer, the term of this patent is extended or adjusted under 35 U.S.C. 154(b) by 0 days.

(21) Appl. No.: 17/730,314

(22) Filed: Apr. 27, 2022

(65) Prior Publication Data

US 2023/0353811 A1 Nov. 2, 2023

(51) Int. Cl.
*H04N 21/422* (2011.01)
*H04N 21/472* (2011.01)
*H04N 21/488* (2011.01)

(52) U.S. Cl.
CPC ... *H04N 21/4221* (2013.01); *H04N 21/42227* (2013.01); *H04N 21/47217* (2013.01); *H04N 21/4884* (2013.01)

(58) Field of Classification Search
None
See application file for complete search history.

(56) References Cited

U.S. PATENT DOCUMENTS

| | | | | |
|---|---|---|---|---|
| 5,572,260 A | * | 11/1996 | Onishi | G11B 31/00 348/460 |
| 2010/0232762 A1 | * | 9/2010 | Kendall | H04N 21/47 386/E5.003 |
| 2016/0100210 A1 | * | 4/2016 | Choe | H04N 21/47 386/234 |
| 2017/0185260 A1 | * | 6/2017 | Mardirossian | H04N 21/4316 |
| 2018/0160069 A1 | * | 6/2018 | Burger | H04N 21/42204 |
| 2018/0160190 A1 | * | 6/2018 | Kahn | H04N 21/4854 |

* cited by examiner

*Primary Examiner* — Samira Monshi
(74) *Attorney, Agent, or Firm* — Seed IP Law Group LLP

(57) ABSTRACT

A system and method for initiating closed captioning. The system includes a processor that can receive an instruction to add closed captioning. The system may also, upon receiving the instruction, determine a time point at which to begin the closed captioning and determining an amount of closed captioning to include, and output, for display, the closed captioning.

14 Claims, 11 Drawing Sheets

ONE BUTTON ON-DEMAND CLOSED CAPTIONING

BACKGROUND

Content programs, for example television programs and/or other types of streamed or otherwise provided media, are a common source of entertainment. While content viewers often intend to hear an entirety of the audio played during the content program, occasionally viewers can have their attention diverted, or dialogue and/or other audio within the program may become distorted, buffer improperly in the case of internet-streamed content, or otherwise become difficult to comprehend. Further, some viewers may have hearing difficulties and/or may be unable to recognize dialogue in certain dialects or accents.

Accordingly, content viewers will miss certain dialogue or other audio, which can cause a source of frustration to the content viewer, and could lead to the content viewer failing to fully understand or appreciate the content program.

Closed captioning is one method used to aid viewers, particularly those hard of hearing or otherwise unable to understand a particular language, accent or dialect. Closed captioning is a written depiction of what is heard and being said in a content program. Closed captions are generally displayed as lines of text on the bottom of the content viewer's screen. Generally speaking, closed captioning intends to have the lines of text synchronized to the actual content of the content program, though this is prone to error, whereby closed captioning lines may be delayed or even ahead of dialogue or other sound depending on a series of variables relating to the creation of the closed captioning text and the providing of the closed captioning to the content viewer's display screen.

Further, many content viewers are averse to having closed-captioning on at all times because it takes up space on the display screen, thus limiting the amount of content that can be seen on the display screen. Additionally, closed captioning is often distracting and can cause a content viewer to unintentionally or intentionally fail to follow the video content being shown on the display program. Thus, there is a need to improve aspects of closed captioning to be more directed to viewers at specific and particular times of need.

SUMMARY

Various embodiments described herein generally provide apparatuses, systems and methods to initiate closed captioning to a content program.

According to one embodiment, a system for initiating closed captioning to a content program is provided. The system includes a processor. The processor is configured to receive an instruction to add closed captioning. Then, upon receiving the instruction, the processor is configured to rewind the content program by a predetermined amount of time. The processor is further configured to activate the closed captioning corresponding to the content program beginning at a first time point corresponding to where the content program is rewound to, and to output, for display, the content program with the corresponding closed captioning beginning at the first time point corresponding to where the content program is rewound to.

According to one embodiment, a system for initiating closed captioning to a content program is provided. The system includes a processor. The processor is configured to receive an instruction to add the closed captioning. Then, upon receiving the instruction, the processor is configured to source a memory for a predetermined amount of the content program immediately prior to the receipt of the instruction to add closed captioning to the display, and source the memory for closed captioning corresponding to the predetermined amount of the content program immediately prior to the receipt of the instruction. The processor is also configured to output, for display, the closed captioning corresponding to the predetermined amount of the content program immediately prior to the receipt of the instruction.

According to some embodiments, a method for initiating closed captioning is provided. The method includes receiving an instruction to add closed captioning. Upon receiving the instruction, the method includes determining a time point at which to begin the closed captioning and determining an amount of closed captioning to include. The method further includes outputting, for display, the closed captioning.

DETAILED DESCRIPTION OF EMBODIMENTS

Figure 1:
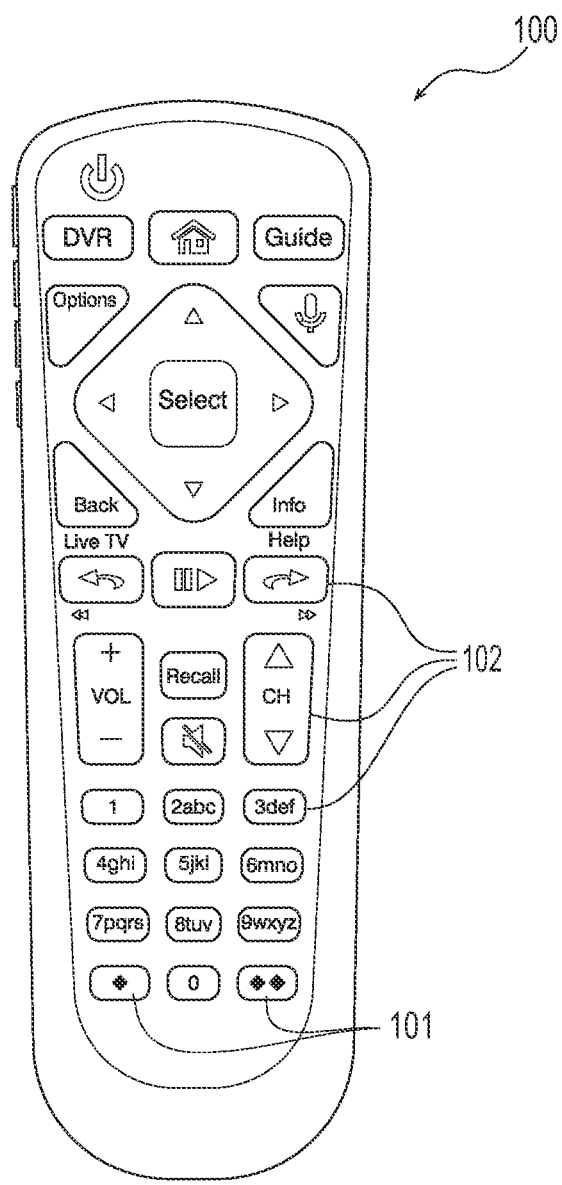
FIG. 1 shows a remote control having a programmable button according to one or more embodiments.

The various embodiments described herein generally provided apparatuses, systems and methods for initiating closed captioning onto a display screen.

Watching a content program such as a media content program, on a display device, such as a television screen, laptop screen, tablet screen, cellular phone, or any device capable of receiving and/or displaying content program, is a common occurrence. For a variety of reasons, a user, which may be a content viewer, may not fully understand and/or appreciate all or certain parts of audio during a viewing of the content program. For example, the content viewer may have the viewing of content program interrupted by children, a barking dog, or other disruptions. Further, the content viewer may lose focus during the viewing and fail to fully hear or understand particular lines of dialogue. Still further, the content viewer may have hearing or other disabilities that make it difficult for him to fully understand an entirety of the audio during a content program. Even more, language differences, dialects and accents of those speaking in the content program and the like might cause a content viewer to miss or otherwise fail to fully understand at least some of the audio of the content program.

Closed captioning is a function of many televisions and other media display devices that allows for lines of text that correspond to audio content to be displayed on a screen, usually toward the bottom of the screen. For closed captioning, spoken words comprising the content program's soundtrack are generally transcribed by a human operator using stenotype machines, and the output of the machines will be instantly translated into text by a computer and displayed on the screen. This method is often used for pre-recorded media content, but could even be used for live broadcasts. In live broadcasts, due to the nature of the broadcast, content viewers often see the closed captioning delayed by several seconds or more. Other methods of closed captioning include automatic computer speech recognition, which can be used to recognize a speaker's voice, transcribe the words, and display the words on the screen.

In some cases, the transcript of closed captioning is available beforehand, and captions are simply displayed during the program after being edited. The captions will be provided to the display device either via a same or parallel signal as the signal transmitting the content program. In situations where the content program is entirely prerecorded, the captions may be stored and sent to the display concurrently with the content program itself.

While closed captioning is useful in many instances, it is often distracting or unwanted. Thus, in most display devices, closed captioning is an optional feature, and can be turned on or off by the content viewer. Generally speaking, when the content viewer intends to activate closed captioning, he will select activate the closed captioning by pressing one or more buttons on a television remote. Once activated, closed captioning will begin and the text will correspond to the current audio being spoken on the content program, or slightly delayed in the case of a delayed closed captioning and/or a live television program. In effect, the closed captioning is hidden from view unless and until the content viewer activates it, after which time the closed captioning will be actively displayed on the display screen.

The closed captioning will remain activated until the content viewer requests to turn the closed captioning off, the program ends, a new program without closed captioning begins, the display device and/or component transmitting the content program to the display device is turned off, or the like.

For a content viewer to use closed captioning to understand words that have already been spoken, the content viewer will have to rewind the content program (if a rewind function is even available), then activate the closed captioning, and view the missed portion of the content. Then, the content viewer would need to turn off the closed captioning to remove the closed captioning when the content viewer has reached the point in the program where he no longer needs the closed captioning.

Thus, while having some utility, closed captioning in this case does not have the ability to aid the content viewer in efficiently filling in relatively small gaps of audio where the content viewer has, only briefly, failed to comprehend some lines of dialogue or the like. Also, such an operation is inefficient, clunky, and requires multiple actions to fully control the closed captioning. Still further, in a situation such as a live television program, the closed captioning may not fully match actual audio and thus it may be even more complicated to find the correct and desired closed captioning.

Improvements to closed captioning allowing for one-button or otherwise efficient temporary activation of the closed captioning, and particularly in a manner in which the closed captioning provides a content viewer with a one-touch operation to allow for a provision of information to address a potential lack of understanding of recently played audio, are desirable.

FIG. 1 shows a remote control 100 according to some embodiments. The remote control may include buttons 102 that may comprise, for example, one or more power buttons, a home screen button and a button to activate apps. The apps button may allow access to a digital marketplace that includes options to purchase (or freely receive) content, products, and various other applications.

Other examples of buttons 102 include buttons to control live TV or recorded content, such as rewind, fast forward and pause/play buttons. Volume control buttons may also exist, and may be coordinated with a television unit or other display unit to control the volume on the unit without signaling to a set-top box. The remote control 100 may have other buttons 102, for example as shown in FIG. 1 or in addition to those shown in FIG. 1. While not shown, remote control 100 may include a touch screen that allows for customizable and/or changeable touchable buttons to carry out various functions, optionally replacing some or all of buttons 102. Further, the buttons 102 may include an audio button that activates a microphone may be included on the top face of the remote control 100 or along a side of the remote control 100.

Further, as shown in FIG. 1, the remote control 100 may include one or more programmable buttons 101. These programmable buttons may be programmed to have a particular function, for example to activate an app, access a DVR or turn on or off closed captioning. The programmable buttons 101 may be customizable by the content viewer. That is, the content viewer may be able to customize the functionality of the buttons by accessing a menu and selecting a desired option from a list of potential options.

Figure 2:
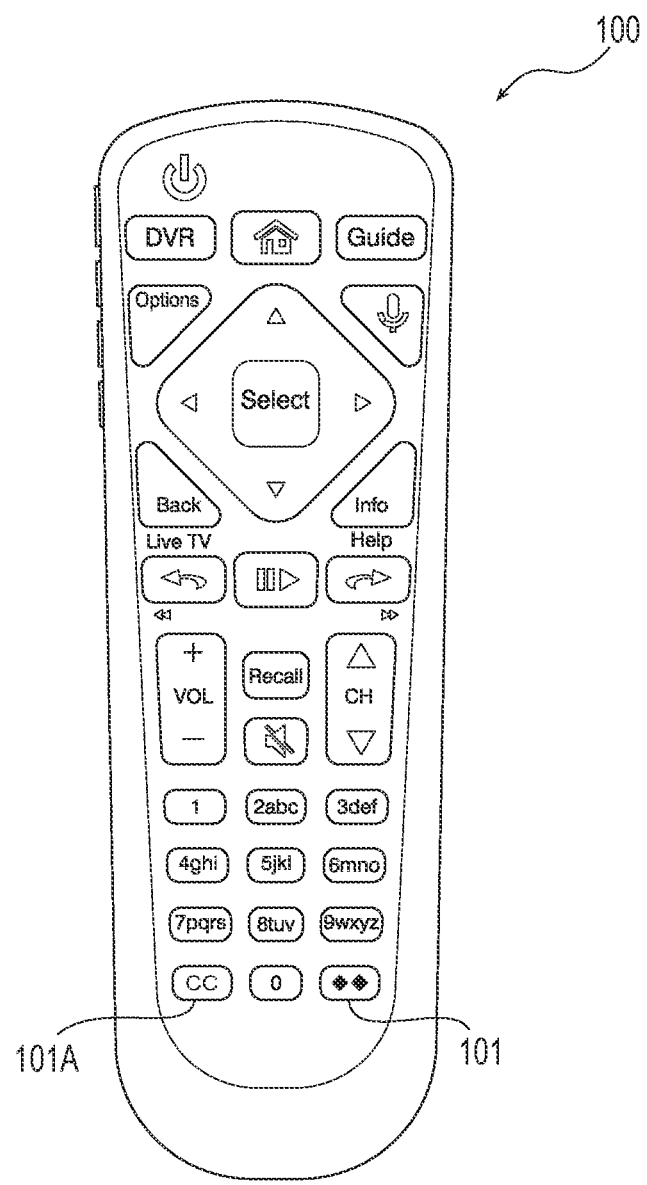
FIG. 2 shows a remote control having a dedicated button according to one or more embodiments.

FIG. 2 shows a remote similar to that of FIG. 1, but where one of the programmable buttons 101 has been replaced by a CC button 101A. The CC button in this case is a button to control closed captioning according to one or more of the embodiments described in further detail herein. One or more of the programmable buttons 101 in FIG. 1 may also have these same characteristics.

Figure 3:
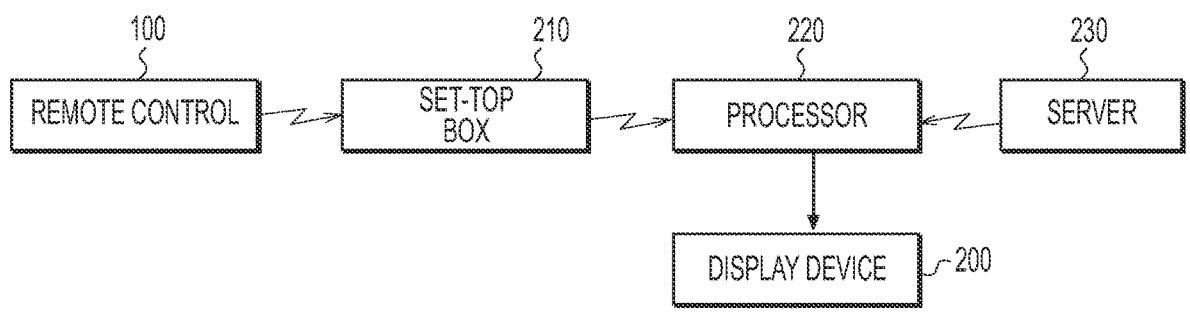
FIG. 3 shows a system diagram according to one or more embodiments.

FIG. 3 shows a system diagram according to some embodiments. In FIG. 3, the remote control 100 is communicatively coupled to a set-top box 210, which is communicatively coupled to a processor 220, which might be a hardware processor and may include a central processing unit and/or a microprocessor and associated circuitry. The processor 220 is communicatively coupled to both a server 230 and the display device 200.

In some implementations, the content viewer will transmit a command for an operation using the remote control 100. This may occur via radiofrequency (RF), infrared (IR) transmission, by internet (wired or wireless) or local network transmission, optionally including Bluetooth or other near field transmission.

In some implementations, the set-top box 210 will receive the command and then can process and execute the command either using the processor 220 internal thereto, or by communicating with an external processor 220 (which also may be a hardware processor having the same configuration described above). The command may be, for example, a command to activate closed captioning and/or rewind the content program, as described later. This may involve the processor 220 contacting the server 230, which may be a local server in or connected to the set-top box 210, or an external server hosted by, for example, the content provider or the third party. For example, in a case where closed captioning and rewinding is requested, the external server may be contacted to in order to receive the information of the closed captioning and/or stored data allowing for rewinding, or the set-top box 210 or server internal thereto may have a memory capable of storing the closed captioning and/or content to allow for rewinding of the content program.

Also in some implementations, the operation will be completed by outputting, for display, the closed captioning or the rewound content, which may optionally include transmitting information, for example the closed captioning or the rewound content, to the display device 200.

In some embodiments, the set-top box 210 may be omitted and, for example, the external server 230 and/or display device may include the appropriate hardware (including a processor 220) to execute the command without a need for a set-top box 210. This may occur, for example, in streaming content where an internet connection is used to download and buffer content directly from the internet.

Figure 4A:
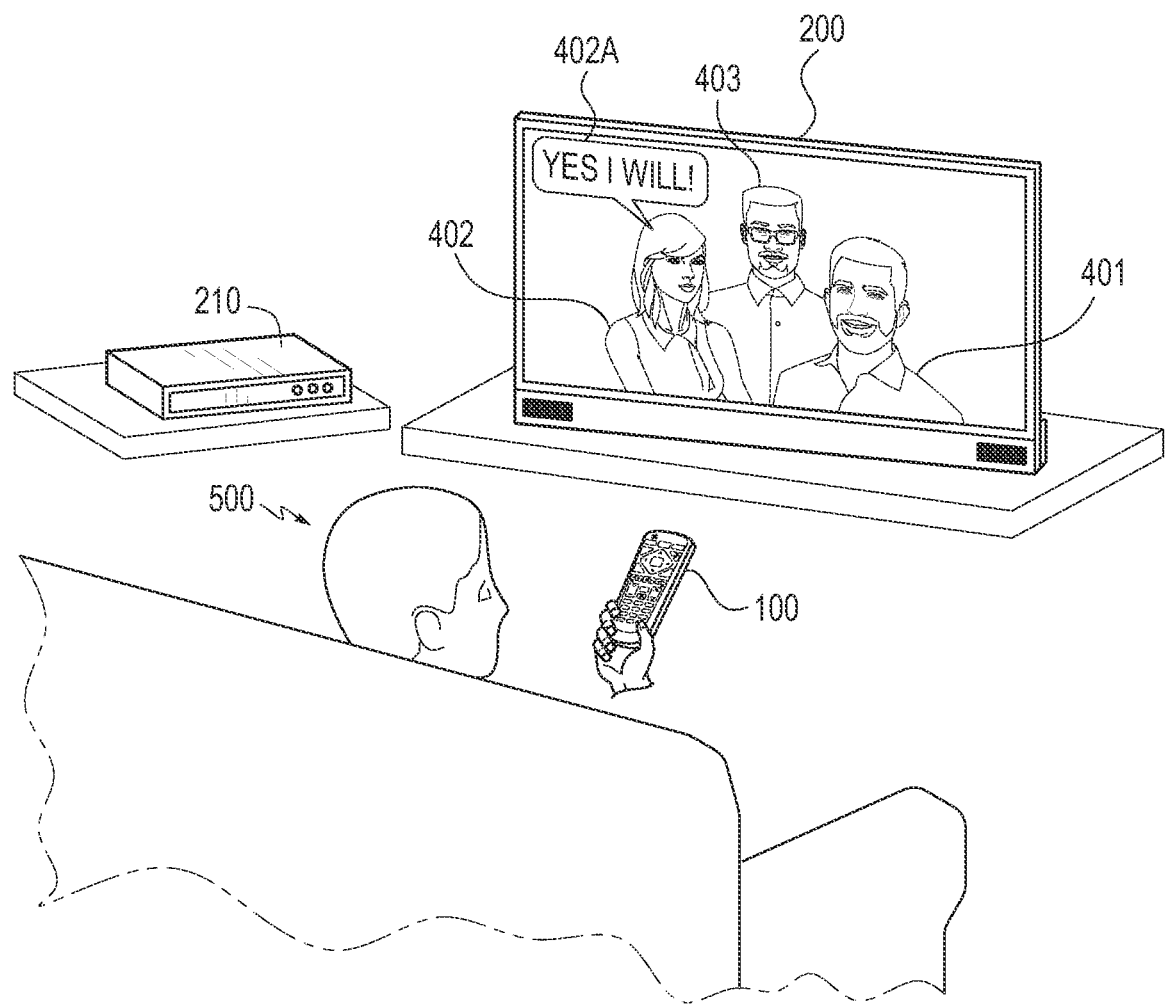
FIGS. 4A-4C are pictorial diagrams representing an initiation of closed captioning using a system according to one or more embodiments.
Figure 4B:
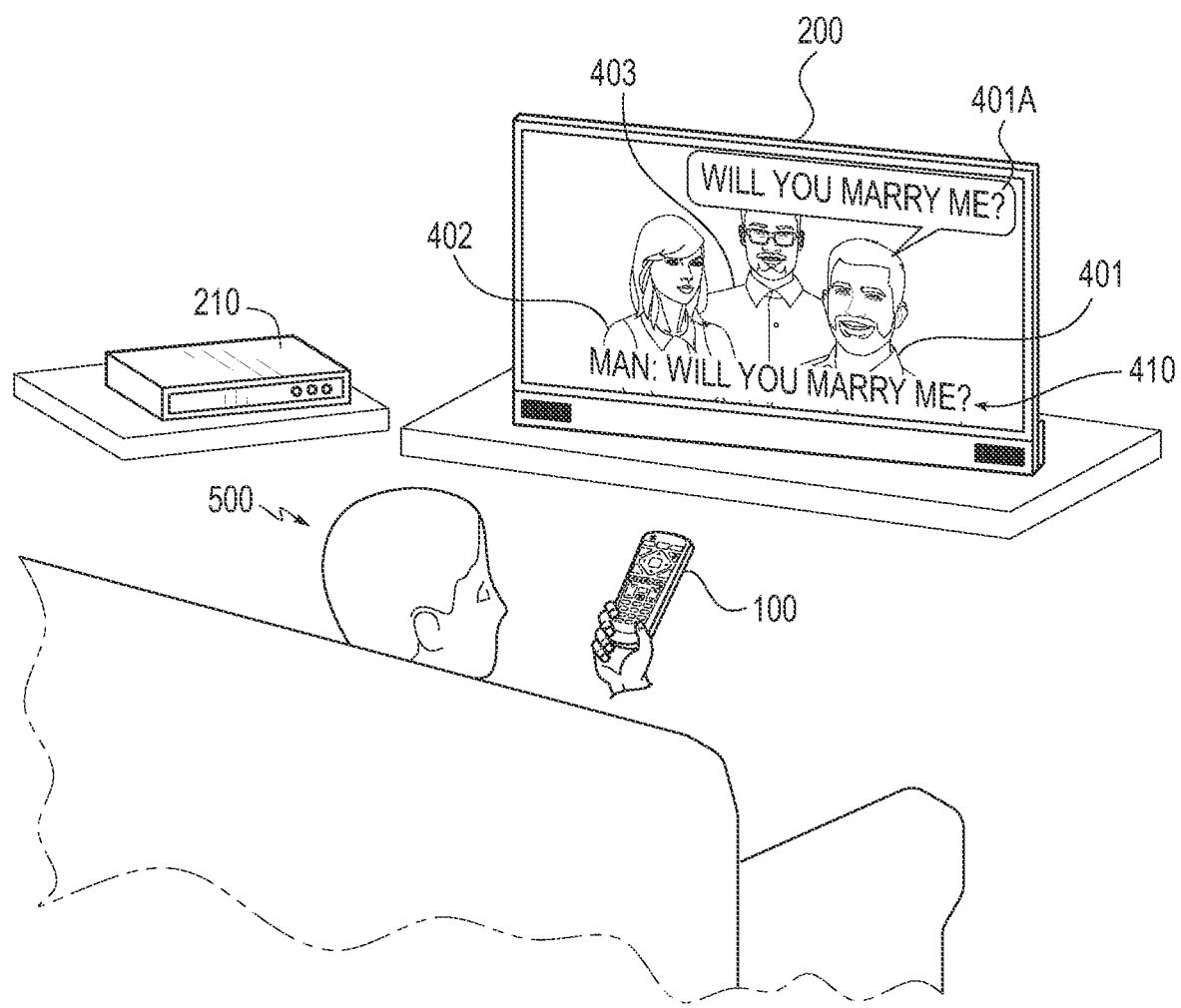
Figure 4C:
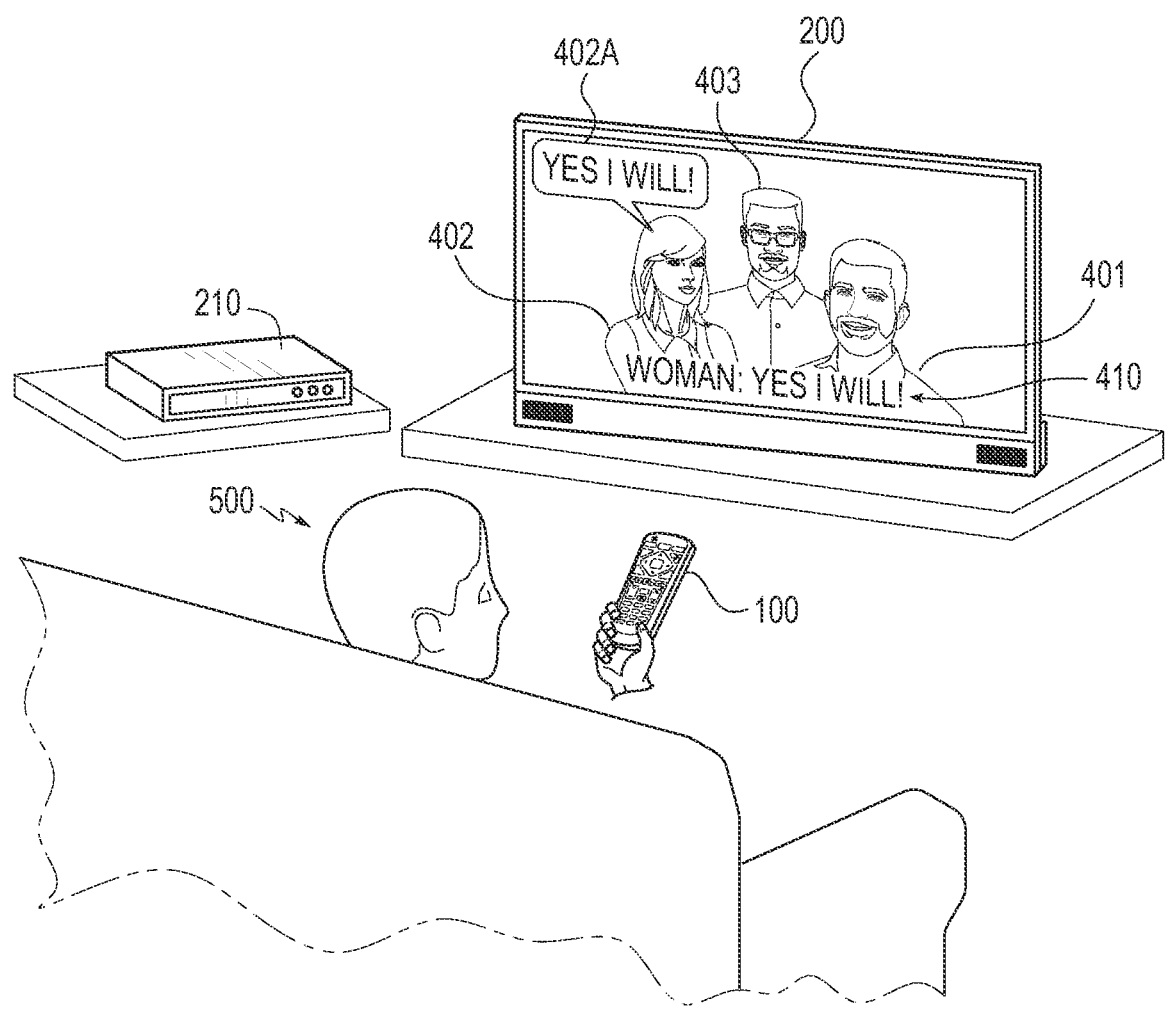

FIGS. 4A-4C show an operation of closed captioning according to one or more embodiments. As shown in FIG. 4A, a content viewer 500 is watching content program, such as a television program, on a display device 200. While a television is used as a display device 200, the display device may be any device and/or screen that allows for content to be displayed, such as a tablet, a laptop or desktop computer screen, a cellular phone, or some other display screen. Further, while a television program is shown, other content programs such as video streamed on the internet, or any other sort of media may be shown on the display screen. Further, the content program may only be a short clip of media, such as a few seconds, or may be a longer, full length (e.g., 30 minutes, 1 hour, or more) program.

The content program may be provided by a content provider. The content provider may utilize a set-top box such as set-top box 210 to receive, store and/or transmit content program to a content viewer, via the display device 200 or otherwise. The set-top box 210 may be communicatively coupled to the display device 200 through any type of wired or wireless connection. Exemplary wired connections include coaxial, fiber, composite video and high-definition multimedia interface (HDMI). Exemplary wireless connections include WiFi and Bluetooth. In at least one embodiment, the set-top box 210 may be embodied in a television converter device (e.g., a satellite television receiver). The set-top box 210 may also be incorporated into the display device 200. The set-top box 210 should not be limited and can be any device which is capable of receiving data streams and processing and managing presentation of such data streams on the presentation device, including a computer, server, streaming players (Apple TV, Roku, etc.), or other similar device.

In some embodiments, the set-top box 210 includes a digital video recorder (DVR) and/or recording capabilities. The set-top box may connect to a storage within a remote server, such as the server 230, hosted or otherwise used by the content provider, so as to acquire recorded content for later playback. The set-top box 210 may also include its own storage that allows for local storage of a content program that has been recorded, which can then be locally prepared for display, which may include being transmitted to the display device 200 upon request.

As shown in FIG. 4A, the content viewer 500 is viewing a television program on the display device 200. At the portion of the television program shown in FIG. 4A, the first character 401 is looking towards the second character 402, and a third character 403 is looking in the background. The second character 402 audibly speaks the phrase "yes I will!" 402A. The text "yes I will!" 402A is represented on the display device 200 in FIG. 4A as a speech bubble to represent the speech from the second character 402 for purposes of illustration, but is not actually shown on the display device 200. Instead, the content viewer 500 can hear these spoken words from second character 402.

In FIG. 4A, closed captioning is not present on the screen. This may be because the content viewer 500 does not generally find a need for closed captioning, finds closed captioning distracting, or otherwise has chosen not to utilize closed captioning.

Consider the case where the content viewer 500 has heard the words "yes I will!" 402A from second character 402 but cannot fully appreciate the context from which this phrase has been initiated. That is, the content viewer 500 may have heard the phrase "yes I will!" 402A but may have missed the content that preceded this response from second character 402. This may be because the content viewer 500 became distracted shortly before the phrase "yes I will!" 402A was uttered, or because the previous discussion was difficult to understand due to an accent, a language difference, a technical issue, or something that made the previous discussion otherwise unintelligible.

Thus, in the example shown in FIG. 4A, the content viewer 500 has heard the phrase "yes I will!" 402A from second character 402, but does not know the context leading to this response. Thus, the content viewer cannot fully appreciate some aspects of the content program, and may be frustrated or otherwise not fully engaged with the content.

FIG. 4B shows an operation according to one or more embodiments. In FIG. 4B, the content viewer 500, either immediately after hearing the "yes I will!" 402A phrase in FIG. 4A or sometime shortly thereafter, wishes to hear the context leading to "yes I will!" 402A phrase. He presses a button on the remote control 100, for example one of the programmable buttons 101 or CC button 101A described with reference to FIGS. 1 and 2, respectively, and an operation occurs. In this case, the operation will be to rewind the content program by a predetermined amount of time, and activate closed captioning. This may occur using the processor 220, which will directly or indirectly receive the operation request from the remote control 100. As shown in FIG. 4B, the content program will be rewound some amount of time and the first character 401 will be speaking the phrase "will you marry me?" 401A. This phrase will be shown as closed captioning text 410. Thus, the closed captioning text 410 is prepared to be output, for display, and is provided in response to a one-button request from the content viewer 500.

In some embodiments, upon receiving the request from the content viewer 500, the processor 220 sources a memory such as a memory within the set-top box 210 or within the server 230 for the audio transcript and for the previously displayed content program (including video), and transmits the transcribed audio, as closed captioning, to the display device 200 along with the rewound portion of the content program.

Owing to this feature, a content viewer may be able to, using a one-touch system, activate closed captioning to display text of content (e.g., audio optionally including dialogue) that had already been spoken in the content program, but was missed by the content viewer 500 for some reason, such as a distraction or some other inability to properly hear the content. The content viewer 500 thus, by a simple operation, can review the missed content and see a transcription of the content on the display device 200.

The predetermined amount of time by which the content program is rewound, either using technology and storage within the display device 200 itself and/or the set-top box 210 and/or connection of either the display device 200 or the set-top box 210 to a server 230 storing the content program, may be about 2 to about 30 seconds, or about 3 to about 20 seconds, or about 5 to about 10 seconds, or about 10 seconds. The predetermined amount of time will be an amount of time sufficient to allow the content viewer 500 to review recently missed data, but may not be excessive so as to avoid forcing the content viewer 500 to review an excessive amount of the already viewed content program, and improve efficiency of viewing the content program by returning to the original position of the content program in a prompt manner. The system may also allow for the content viewer 500 to rewind the program multiple times (e.g., by a first predetermined amount of time, and by a further predetermined amount of time) in the case that the content viewer 500 may have missed a larger than usual amount of the content. The further predetermined amount of time may be the same as the first predetermined about of time, or may be, for example, about 10% longer or about 20% longer or about 50% longer than the first predetermined amount of time.

FIG. 4C shows the playback of the content program returning back to the point at which the content viewer 500 made the request to rewind and activate closed captioning. As shown in FIG. 4C, the closed captioning 410 now shows the words "yes I will!" 402A. The closed captioning may remain on for a predetermined period, but then may automatically shut off after the predetermined period. For example, once the content program reaches the original point at which the content viewer 500 made the request to rewind and activate closed captioning, or some time slightly thereafter, for example about 1-10 seconds thereafter or about 3-5 seconds thereafter or about 5 seconds thereafter, the closed captioning may deactivate. This will allow the content viewer to have understood the missing context, but allow for closed captioning to turn off so that the content viewer does not have to undesirably view closed captioning for the remainder of the program. In other words, the predetermined period may be a period from a first time point corresponding to where the content program is rewound to until a second time point at which the content program reaches a position corresponding to when the instruction to add closed captioning to the display was received. Additionally or alternatively, the predetermined period is a period from the first time point corresponding to where the content program is rewound to until a third time point, the third time point being a predetermined time after a time at which the content program reaches a position corresponding to when the instruction to add closed captioning to the display was received.

While the system may allow for closed captioning to be turned off after a predetermined period of time as discussed above, the content viewer 500 may also be able, with a one-button touch operation, to manually turn off the closed captioning before the predetermined period of time or in a case where the closed captioning is programmed to stay on until a content viewer operation. In this case, the content viewer 500 may press a button on the remote control 100, for example one of the programmable buttons 101 or CC button 101A described with reference to FIGS. 1 and 2, respectively. This may be the same button used to activate the rewinding and closed captioning generally, or another button. The content viewer may also be able to use a fast forward button to fast forward the content program back to a desired place, for example after the content viewer has already heard and understood the missing context and is already ready to return to a particular portion of the content program.

Figure 5A:
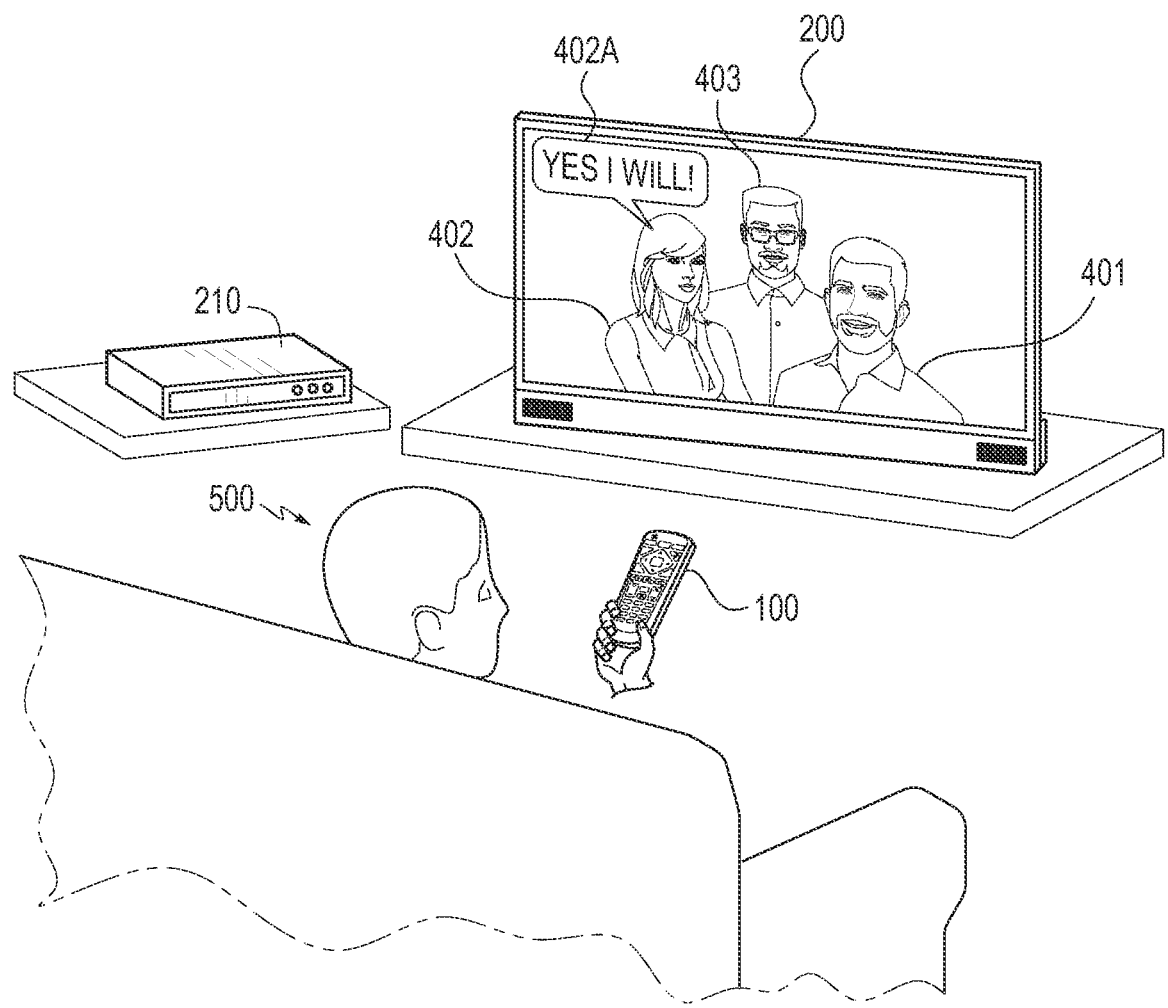
FIGS. 5A and 5B are pictorial diagrams representing an initiation of closed captioning using a system according to one or more embodiments.
Figure 5B:
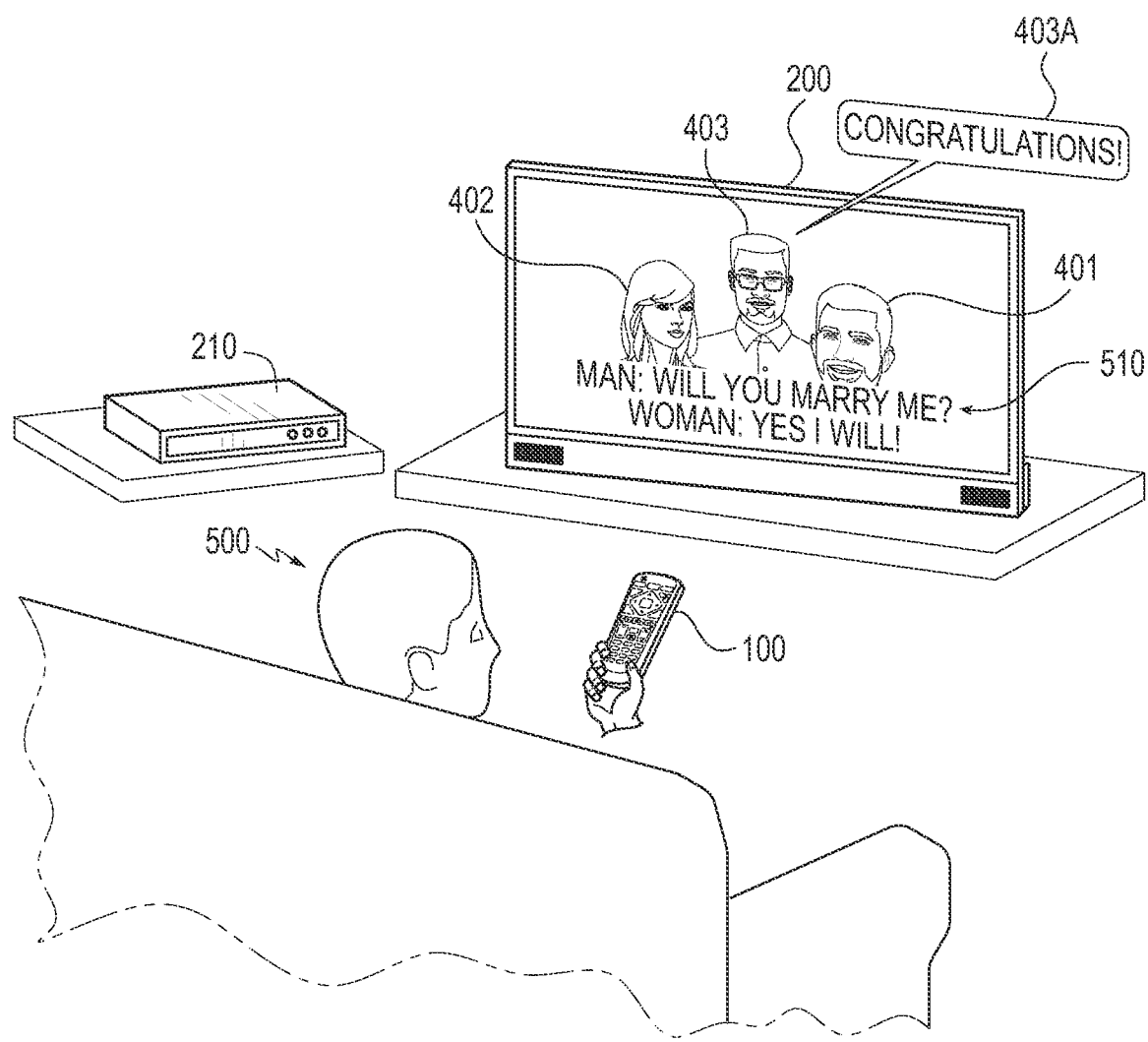

FIGS. 5A and 5B show another implementation of a closed captioning system according to some embodiments. Similarly to FIG. 4A, FIG. 5A shows the content viewer 500 viewing a television program on the display device 200. At the portion of the television program shown in FIG. 5A, the first character 401 is looking towards the second character 402, and the third character 403 is looking in the background. The second character 402 audibly speaks the phrase "yes I will!" 402A. The text "yes I will!" 402A is represented on the display device 200 in FIG. 5A as a speech bubble to represent the speech from the second character 402 for purposes of illustration, but is not actually shown on the display device 200. Instead, the content viewer 500 can hear these spoken words from second character 402.

Consider again the case where the content viewer 500 has heard the words "yes I will!" 402A from second character 402 but cannot fully appreciate the context from which this phrase has been initiated. That is, the content viewer 500 may have heard the phrase "yes I will!" 402A but may have missed the content that preceded this response from second character 402. This may be because the content viewer 500 became distracted shortly before the phrase "yes I will!" 402A was uttered, or because the previous discussion was difficult to understand due to an accent, a language difference, a technical issue, or something that made the previous discussion otherwise unintelligible.

Thus, in the example shown in FIG. 5A, the content viewer 500 has heard the phrase "yes I will!" 402A from second character 402, but does not know the context leading to this response. Thus, the content viewer cannot fully appreciate some aspects of the content program, and may be frustrated or otherwise not fully engaged with the content.

FIG. 5B shows an operation according to one or more embodiments. In FIG. 5B, the content viewer 500, either immediately after hearing the "yes I will!" 302A phrase in FIG. 5A or sometime shortly thereafter, wishes to hear the context leading to the "yes I will!" 402A phrase. He makes a request by pressing a button on the remote control 100, for example one of the programmable buttons 101 or CC button 101A described with reference to FIGS. 1 and 2, respectively, and an operation occurs. In this case, the operation will be to initiate closed captioning while maintain the current state of play of the media program. Thus, the closed captioning text 410 can be provided in response to a one-button request from the content viewer 500.

As shown in FIG. 5B, the content program continues. In this case, the content program continues by the third character 403 saying "congratulations" 403A, which is a response to the second character stating "yes I will!" in FIG. 5A. In some embodiments, there is no change to the playback of the content program, that is, the program continues to play at the same speed as previously, and without pausing or rewinding the content program. However, in some embodiments, the system may pause the content program or slow the speed of the content program, for example slow the speed to 75% or 50% or 25%, while the operations described herein occur, so as to allow the content viewer 500 an opportunity to more closely review the closed captioning described herein while still being able to follow currently playing material. This may occur using the processor 220, which will directly or indirectly receive the operation request from the remote control 100.

Further, the processor 220 may initiate closed captioning 510 in response to the button being pressed on the remote control 100. In the case described in this embodiment, the closed captioning 510 will include lines of previously spoken dialogue or audio content, which in this case are the first character 401 asking "will you marry me?" and the second character 402 responding "yes I will!" In this case, because the content program continues to run in real time (e.g., at a same speed, or also at a slower speed without being rewound), the text being shown in the closed captioning 510 is text corresponding to a previously heard dialogue, not the currently spoken dialogue.

In some embodiments, upon receiving the request from the content viewer, the processor 220 sources a memory such as a memory within the set-top box 210 or within the server 230 for the audio transcript, determines an amount of audio corresponding to a predetermined time or amount of the content program, and outputs and/or transmits the transcribed audio, as closed captioning, to the display device 200.

Owing to this feature, the content viewer 500 may be able to, using a one-touch system, activate closed captioning to display text of content (e.g., audio optionally including dialogue) that had already been spoken in the content program, but was missed by the content viewer 500 for some reason, such as a distraction or some other inability to properly hear the content. The content viewer 500 thus, by a simple operation, can review the text corresponding to the missed content and see a transcription of the content on the display device 200, without needing to rewind the program and delay viewing of the content program.

The amount of text that may be shown in closed captioning 510 may be based upon a predetermined criteria. For example, a predetermined number of lines of text may be shown. In some embodiments, the 2 lines, or 3 lines, or 2-5 lines of dialogue or audio content prior to the initiation of the request to activate the closed captioning may be shown as closed captioning 510. In some embodiments, instead of choosing a predetermined number of lines of text to show, the processor 220 will source the memory for transcribed audio data of a predetermined amount of time before the initiation of the request. The predetermined amount of the content program immediately prior to the receipt of the instruction being sourced and ultimately output for display, which may include being transmitted to and ultimately displayed on the display device 200 may be from about 5 to about 30 seconds, or about 5 to about 15 seconds, or about 10 seconds.

Further, at some point after a predetermined period of time of displaying the closed captioning 510, the closed captioning 510 may be deactivated. For example, the closed captioning 510 may remain on for about 5 seconds to about 1 minute, or about 10 seconds to about 30 seconds, or about 20 seconds, after which time, the closed captioning may deactivate. This will allow the content viewer to have caught up on the missing context, but allow for closed captioning to turn off so that the content viewer does not have to undesirably view closed captioning for the remainder of the program.

While the system may allow for closed captioning to be turned off after a predetermined period of time as discussed above, the content viewer 500 may also be able, with a one-button touch operation, to manually turn off the closed captioning before the predetermined period of time or in a case where the closed captioning is programmed to stay on until a content viewer's operation. In this case, the content viewer 500 may press a button on the remote control 100, for example one of the programmable buttons 101 or CC button 101A described with reference to FIGS. 1 and 2, respectively. This may be the same button used to activate the rewinding and closed captioning generally, or another button. This may be applicable after the content viewer has already heard and understood the missing context and is already ready to remove the closed captioning.

Figure 6:
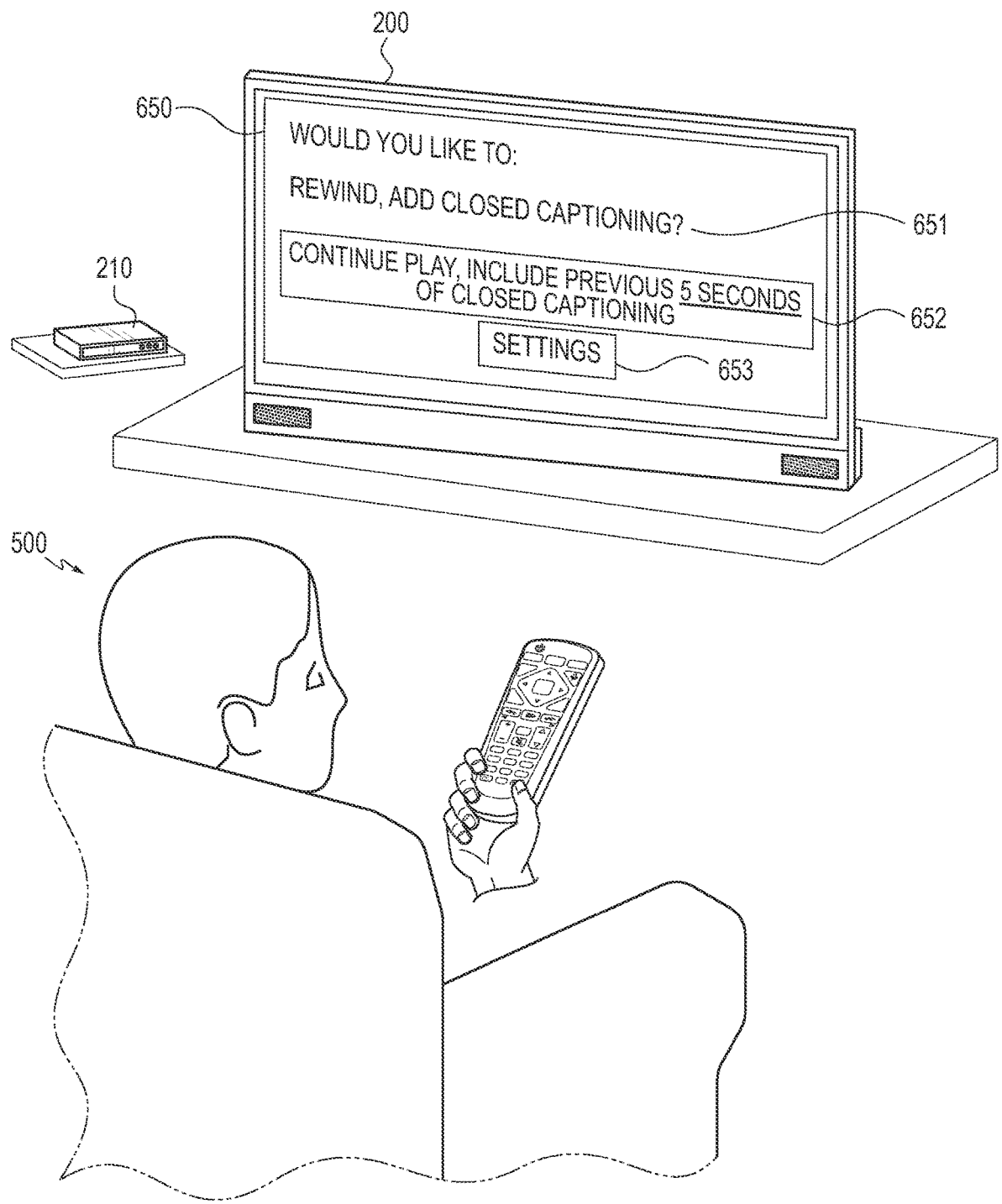
FIG. 6 is a pictorial diagram representing a selection relating to closed captioning using a system according to one or more embodiments.

FIG. 6 shows a menu 650 where the content viewer 500 may choose between options relating to closed captioning. The content viewer 500 may initiate the menu 650 by pressing one or more of the programmable buttons 101, either by a single press or by multiple presses, or some other predetermined action. Once entering the menu, the content viewer 500 can select rewind option 651, which is for the system to rewind and add closed captioning upon the content viewer's 500 request, which would be similar to the process described in FIGS. 4A-4C. The content viewer 500 may also select continue option 652, which is for the system to, upon the content viewer's 500 request, add closed captioning while continuing current playback of the content program (without rewinding), as shown in FIGS. 5A-5B. Within continue option 652 is a further selectable option where the content viewer 500 may change to include a different time or amount of closed captioning to show. This may be configured by the content viewer 500 operating settings menu 653, which may be shown as a button on the screen of FIG. 6.

Figure 7:
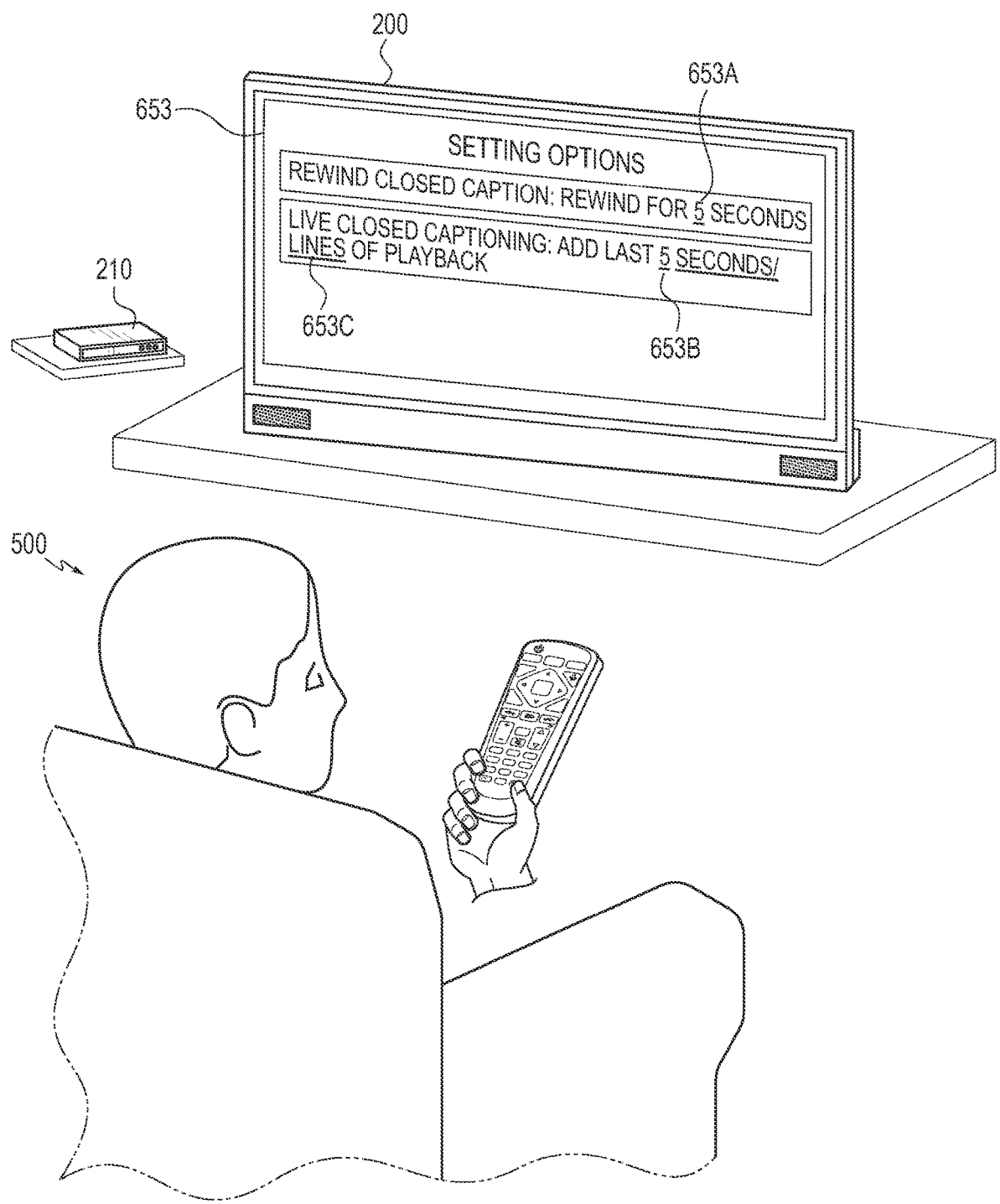
FIG. 7 is a diagram of a setting screen according to one or more embodiments.

FIG. 7 shows the menu of settings menu 653. The settings menu 653 shows multiple options relating to rewind option 651 and continue option 652 described in FIG. 6. Rewind time option 653A allows the content viewer 500 to change an amount of time for which the "rewind closed caption" (e.g., configuration of FIGS. 4A-4C) occurs. As shown, the option is to rewind the content program for 5 seconds once the content viewer request the rewind closed captioning occurs. This can be changed to, for example, 10 seconds, or 1 second, or 30 seconds, or another viable amount of time.

Time or playback option 653C allows for the content viewer to choose, if the continue option 652 of "live closed captioning" (e.g., configuration of FIGS. 5A-5B) is active, how much time or what amount of playback will occur. The content viewer can first choose whether the closed captioning will be initiated based upon an amount of previous time (e.g., last 5 seconds) or lines (e.g., last 5 lines of audio transcription). Once "lines" or "seconds" is chosen, the content viewer may also choose how many lines, or how many seconds, to display previous audio content for, using modifiable number option 653B. While 5 seconds are shown here, this can be changed to, for example, 10 seconds, or 1 second, or 30 seconds, or another viable amount of time or lines as appropriate.

Thus, by consulting the menu 650 and settings menu 653, the content viewer 500 can preselect which option of closed captioning he would prefer once the closed captioning request is initiated. This can also be modified at any time, with the information being stored within a memory within the set-top box 210, display device 200, or a server 230.

Figure 8:
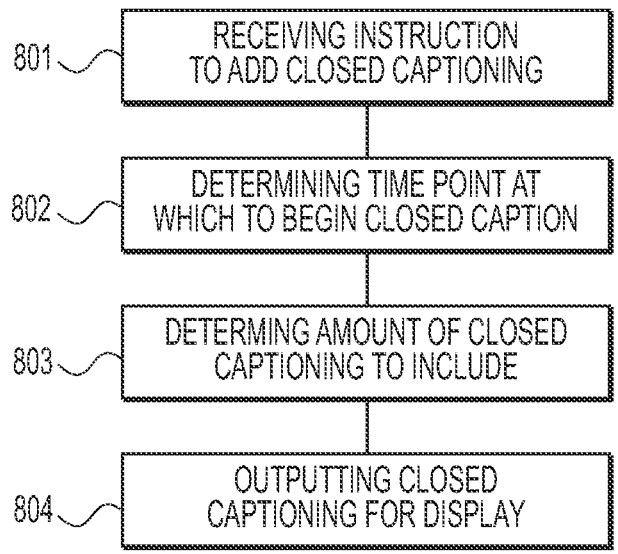
FIG. 8 is a method for initiating closed captioning according to one or more embodiments.

FIG. 8 shows a method according to some embodiments. In a step 801, the method may include receiving an instruction to add closed captioning. This may be in response to, for example, the content viewer 500 requesting the closed captioning by pressing a programmable button 101 on the remote control 100.

In step 802, the method includes determining the time point at which to begin the closed captioning. This may be based upon a preset setting as selected by a content viewer 500 using the settings of FIGS. 6 and 7 or by another operation.

In step 803, the method may determine an amount of closed captioning to include. This may also be based upon a preset setting as selected by a content viewer 500 using the settings of FIGS. 6 and 7 or by another operation.

In step 804, the method may output, for display, display the closed captioning in the amount and/or time determined by steps 802 and 803. As discussed previously, this may involve a processor, either alone or with connection to a server 230, sourcing the content program and/or transcription of audio data and transmitting the appropriate amount and/or time period of audio data to the set-top box 210 and/or display device 200, so that the display device 200 can display the closed captioning on the screen.

Figure 9:
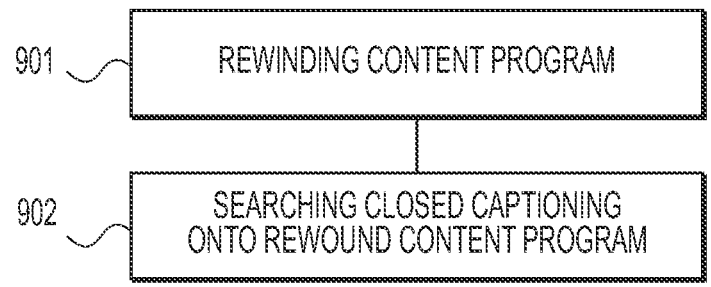
FIG. 9 is method for activating closed captioning on a rewound content program according to one or more embodiments.

FIG. 9 shows additional portions of a method according to some embodiments. The embodiments may be embodiments similar to FIGS. 4A-4C, particularly where the content program will be rewound and closed captioning will be added. In the embodiment of FIG. 9, step 901 includes a step of rewinding the media content. This may be subsequent to the content viewer's request to initiate closed captioning, and thus after step 801 of FIG. 8. However, this may be concurrently with, before or after steps 802 and 803. The method may then include a step 902 of activating the closed captioning onto the rewound content program.

Figure 10:
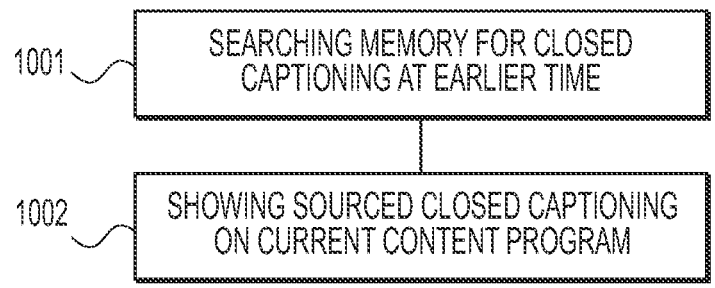
FIG. 10 is a method for activating closed captioning on a real-time content program according to one or more embodiments.

FIG. 10 shows additional portions of a method according to some embodiments. The embodiments may be embodiments similar to FIGS. 5A-5B, particularly where the content program will be continued to be viewed in real time and/or at a slower but still real time pace (without rewinding), and closed captioning will be added. In the embodiments of FIG. 10, step 1001 includes searching a memory for closed captioning at an earlier time (e.g., for a predetermined amount of time or a predetermined amount of audio data prior to the initiation of the step 801 in FIG. 8). Thus, this may be subsequent to the content viewer's request to initiate closed captioning, and thus after step 801 of FIG. 8. However, this may be concurrently with, before or after steps 802 and 803. The method then includes a step 1002 of showing the sourced closed captioning on the currently running (e.g., without any rewinding) content program.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A system for initiating closed captioning for a content program, comprising:
    a processor configured to:
        set a predetermined amount of time prior to the content program being provided to a user;
        provide the content program to the user;
        receive, at a time when the closed captioning is deactivated and the content program is being provided to the user, a one button command to rewind the content program and to activate the closed captioning; and in response to receiving the one button command:
rewind the content program by the predetermined amount of time, the predetermined amount of time being set prior to the content program being provided to the user;
activate the closed captioning corresponding to the content program beginning at a first time point corresponding to where the content program is rewound to; and
cause a display to present the content program with the corresponding closed captioning beginning at the first time point corresponding to where the content program is rewound to.

2. The system according to claim 1, wherein the processor is configured to deactivate the closed captioning after a predetermined period.

3. The system according to claim 2, wherein the predetermined period is a period from the first time point corresponding to where the content program is rewound to until a second time point at which the content program reaches a position corresponding to when the one button command was received.

4. The system according to claim 2, wherein the predetermined period is a period from the first time point corresponding to where the content program is rewound to until a third time point, the third time point being a predetermined time after a time at which the content program reaches a position corresponding to when the one button command was received.

5. The system according to claim 4, wherein the predetermined time is about 3 to about 5 seconds.

6. The system according to claim 1, further comprising a remote control including a programmable button, the programmable button configured to transmit the one button command to activate the closed captioning.

7. A system for initiating closed captioning for a content program, comprising:
a processor configured to execute computer instructions; and
a memory configured to store the computer instructions that, when executed by the processor, cause the processor to:
set a predetermined amount of the content program prior to the content program being displayed;
display the content program on a display;
receive, at a time when the closed captioning is not being displayed with the content program, a command to display the closed captioning;
in response to receiving the command:
identify the predetermined amount of the content program that was displayed immediately prior to receiving the command, the predetermined amount of the content program being set prior to the content program being displayed;
retrieve closed captioning corresponding to the predetermined amount of the content program; and
display, on the display, the predetermined amount of the content program and the retrieved closed captioning; and
after the predetermined amount of the content program and the retrieved closed captioning is displayed, resume display of the content program without the closed captioning.

8. The system according to claim 7, wherein the predetermined amount of the content program immediately prior to the receipt of the command is from about 5 to about 15 seconds.

9. The system according to claim 7, wherein the processor is configured to display the closed captioning for only a predetermined period of time.

10. The system according to claim 9, wherein the predetermined period of time is from about 10 to about 30 seconds.

11. The system according to claim 9, further comprising a remote control including a button, the button configured to transmit the one button command to add the closed captioning to the display.

12. The system according to claim 7, wherein the processor is configured to display a predetermined number of lines of closed captioning on the display.

13. The system according to claim 12, wherein the predetermined number of lines is customizable by a user.

14. A method for initiating closed captioning for a content program, comprising:
setting a predetermined amount of content program prior to displaying the content program;
displaying the content program on a display;
receiving, at a time the closed captioning is deactivated while the content program is being displayed, a command to playback the predetermined amount of content program with the closed captioning activated, the predetermined amount of content program being set prior to displaying the content program;
in response to receiving the command:
determining an amount of closed captioning that corresponds to the predetermined amount of content program;
retrieving the predetermined amount of content program;
retrieving closed captioning corresponding to the determined amount of closed captioning;
activating the closed captioning; and
playing back the retrieved predetermined amount of content program and the retrieved closed captioning; and
deactivating the closed captioning after the retrieved predetermined amount of content program and the retrieved closed captioning are displayed.

* * * * *